United States Patent
Kuehn (10) Patent No.: US 12,309,339 B2
(45) Date of Patent: May 20, 2025

(54) PROCESS COLOR COMPOSITION FOR A PRINTER INCLUDING BOTH THE SUBSTRATE AND THE INK/TONER

(71) Applicant: Fiery, LLC, Fremont, CA (US)

(72) Inventor: Mario Kuehn, Duisburg (DE)

(73) Assignee: FIERY, LLC, Fremont, CA (US)

( * ) Notice: Subject to any disclaimer, the term of this patent is extended or adjusted under 35 U.S.C. 154(b) by 0 days.

(21) Appl. No.: 18/454,716

(22) Filed: Aug. 23, 2023

(65) Prior Publication Data

US 2025/0071230 A1 Feb. 27, 2025

(51) Int. Cl.
*H04N 1/60* (2006.01)

(52) U.S. Cl.
CPC ......... *H04N 1/6097* (2013.01); *H04N 1/6019* (2013.01); *H04N 1/6058* (2013.01)

(58) Field of Classification Search
CPC ... H04N 1/6097; H04N 1/6019; H04N 1/6058
See application file for complete search history.

(56) References Cited

U.S. PATENT DOCUMENTS

| | | | |
|---|---|---|---|
| 6,205,246 B1 * | 3/2001 | Usami | H04N 1/6052 358/1.9 |
| 8,861,053 B2 | 10/2014 | Nudurumati et al. | |
| 9,336,473 B2 | 5/2016 | Nowak | |
| 10,205,849 B2 | 2/2019 | Morovic et al. | |
| 10,265,980 B2 | 4/2019 | Andrea Tallada et al. | |
| 11,481,162 B1 * | 10/2022 | Rao | G06F 3/1282 |
| 2013/0215440 A1 | 8/2013 | Chandermohan | |
| 2016/0078329 A1 * | 3/2016 | Nowak | G06K 15/1882 358/3.24 |

FOREIGN PATENT DOCUMENTS

| | | |
|---|---|---|
| WO | 2007099554 A2 | 9/2007 |
| WO | 2020121353 A1 | 6/2020 |

* cited by examiner

*Primary Examiner* — Christopher Wait
(74) *Attorney, Agent, or Firm* — Perkins Coie LLP (57) ABSTRACT

In printing, the substrate colorant is used for the color management process of images or artwork, printed on white ink/toner covered areas. With the specific inclusion of the substrate colorant, which reduces the amount of white ink/toner printed, a significant extension of the printing color, for substrates with chromatic coloring, or the darkness, for black substrates, is possible.

14 Claims, 8 Drawing Sheets

PROCESS COLOR COMPOSITION FOR A PRINTER INCLUDING BOTH THE SUBSTRATE AND THE INK/TONER

FIELD

Various of the disclosed embodiments concern a process color composition for a printer including both the substrate and the ink/toner.

BACKGROUND

Printing on colored or black substrates is used for print products where a certain portion of the artwork uses the substrate color mostly in a pure way. The other parts of the substrate are usually covered with white ink/toner. These areas usually used by the designer to be filled with additional colors composing the artwork, i.e. the print product.

State of the art applications that use a colored substrate add a white layer for printing additional colorants depending on the specific design of the artwork. The printable gamut for these applications printed on the white surface is mainly defined by the density of the white ink/toner and the maximum ink or toner allowance on that substrate. The amount of allowed ink and toner is significantly reduced by the amount of white ink/toner which is added to the substrate. In most cases 100% white ink/toner is used. Considering that state of the art printing presses allow a maximum amount of ink/toner in the range of 180-250%, the use of white ink/toner visibly reduces the amount of printable ink/toner that may be deposited on top of the white ink/toner.

The remaining amount of printable color components are most likely significantly below 200%. This limits the ability of the printer to compose images having bright and colorful (high chroma) secondary colorants such as red, green, or blue and also limits the darkness of all shades of dark colorants in a significant manner. This can prevent a designer or illustrator from printing more saturated colors and limit them to a smaller range of colors and hues.

Many printing systems simply use a fixed amount of base ink, regardless of the color of the final design and/or color of the substrate. However, because the amount is not case specific, the printable gamut is reduced significantly, as described. Furthermore, sometimes more base ink is deposited and used than is needed, contributing to cost for printing systems and the clients, e.g. designers, who use them. Using more ink than necessary also contributes to operational issues, such as equipment wear, increased drying time and increased energy cost due to the need for increased drying. Current printing systems are not able to modify the amount of base ink for each print job, as doing so may be specific to each digital printer, printing process, printing colorants and substrates. Modifications are sometimes performed manually, through iterations of test prints and expert assessments and time-consuming, also contributing to waste and cost.

Moreover, conventional methods for printing colors, by using more ink than necessary, can lead to excessive greenhouse gas emissions due to the increased need for energy, the environmental effect of volatile ink components, and the need to dispose of more ink cartridges. See Ink Waste: The Environmental Impact of Printer Cartridges https://energycentral.com/c/ec/ink-waste-environmental-impact-printer-cartridges; Environmental impact of printing inks and printing process https://www.researchgate.net/pubiication/346549027_Environmental_impact_of_printing_inks_and_printing_process/fulltext/5fc6c59c92851c00f8450cd3/Environmental-impact-of-printing-inks-and-printing-process.pdf; and How Printing Ink Impacts Environment And Our Health https://wiki.opensourceecology.org/wiki/How_Printing_Ink_Impacts_Environment_And_Our_Health.

SUMMARY

Embodiments of the invention provide a method and apparatus which extend the printable gamut on colored or black substrates if the substrate colorant is identical or close to one of the available printer colorants. The extension of the printable gamut is evident for all use cases with colored or black substrates where certain parts of the substrates are used for printing on top of a layer of white ink/toner.

The benefits and advantages of the implementations described herein also include a reduction excessive greenhouse gas emissions due to the decreased need for energy and the mitigated environmental effect of volatile ink components and the reduced burden on the environment as landfill due to the reduced need to dispose of ink cartridges.

DETAILED DESCRIPTION

Embodiments of the invention provide a method and apparatus that use the substrate colorant in the color management process of images or artworks that are printed on white ink/toner covered areas. With the specific inclusion of the substrate colorant, which reduces the amount of white ink/toner printed, a significant extension of the printing color for substrates with chromatic coloring or darkness for black substrates is possible. Using this technology delivers a clear advantage for these applications, including a bigger printer gamut.

In embodiments of the invention different methods of combining the substrate and the printer colorant are possible. This allows tailoring the result to the specifics of the digital printer, the printing process, the printing colorants, and the substrates.

Printing on colored or black substrate is very common in the industry. There are many use cases for such products. Applications to print artwork on areas of the substrate where the substrate colorant is hidden by a layer of white ink/toner usually show strong gamut restrictions. This is due to the lack of the white opacity and due to the fact that the amount of ink/toner available for color-management of the artwork data is strongly reduced because 100% of the maximum ink/toner allowance is already used for white. This gamut restriction leads to a reduced colorfulness and image quality.

This limitation is significantly improved by the invention. Instead of covering the whole substrate with 100% white ink/toner and then printing the colors on top of the white layer, the colored substrate is added to the color-management process for the artwork. Embodiments of the invention focus on such applications where the substrate colorant is close or identical to one of the printing colorants, e.g. cyan, or black, or any other colorant. The final cyan or black is now composed of both the printer and the substrate colorants. For this composition a wide variety of mathematical functions, i.e. a distribution function, are possible. For example:

$$\text{Substrate } Y = X$$

$$\text{Ink/Toner } Y = \text{round}(\text{Power}(\text{MAX}(X - 40, 0)1, 28))$$

Figure 1:
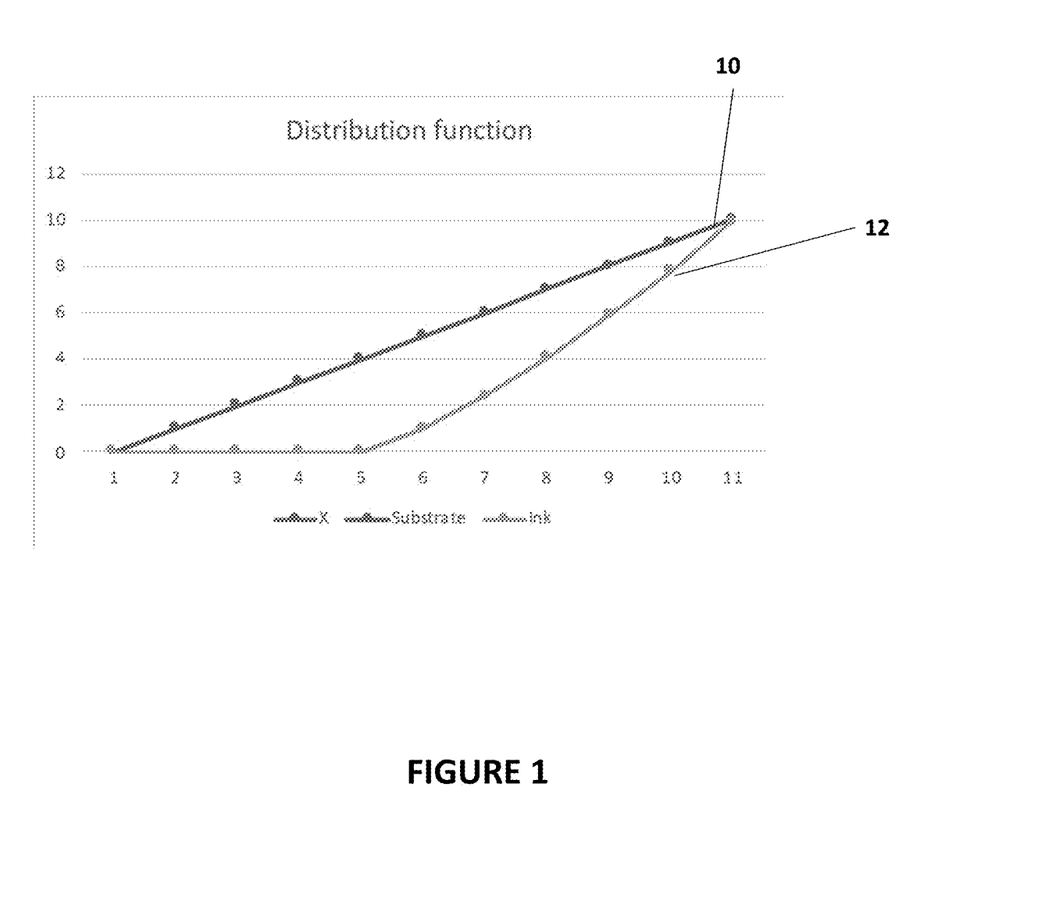
FIG. 1 is a graph showing a color produced using a distribution function to combine a substrate and an ink according to an embodiment of the invention.

FIG. 1 is a graph showing a color produced using a distribution function to combine a substrate 10 and an ink 12 according to an embodiment of the invention. Two of these functions, as examples, are discussed hereinbelow.

The invention is not limited to a specific colorant, neither to CMYK, the standard printing colors, only. Even for printers with, e.g. CMYK+Orange (+White) printing on an orange substrate, the technology can be used.

Every composition of a particular chromatic ink/toner and chromatic substrate adds to the printing gamut at the specific chromatic area where this colorant is used purely or mixed with others. Thus, printing on a black substrate and composing the printing black out of the black substrate+black ink/toner adds to the entire dark portion of the gamut. In this case, the extension of the gamut becomes visible around the whole CIE Hue circle equivalently.

In embodiments of the invention the composing/distribution function can be tailored to the specifics of the ink/toner-substrate-printer combination. Embodiments of the invention can use the substrate colorant first, together with the printer colorant or can start with the printer colorant and add the substrate colorant secondary. Having the substrate colorant as dominant or as trailing component is possible as well.

Any kind of distribution function is possible. If there is a very dark substrate and the white is not completely opaque, the substrate colorant is used first and black is added at the end of the scale, maybe above 80%, to darken it further. But there are other options, where the white print heads may have a lower resolution. Here using the substrate colorant at the light tonal values would lead to noisier printouts. Because of this it is preferred to start with the black ink and use the substrate color just at the higher tonal values.

In all cases the corresponding printer channel uses less ink due to the contribution of the substrate as a colorant and allows a wider gamut, again due to the addition of the substrate as a colorant and the reduced need to cover the substrate with white ink to provide a base upon which to print the image pixels.

In some locations, where the image pixels match the substrate colorant value exactly it may be possible to use only the substrate as the colorant and not apply ink/toner. Further, the substrate color may be used as a colorant component of more than one printer color channel. Consider red paper, which would be printed with yellow+magenta. In such case it is necessary to have a distribution or a replacement function for a combination of Y+M→red substrate.

Figure 2:
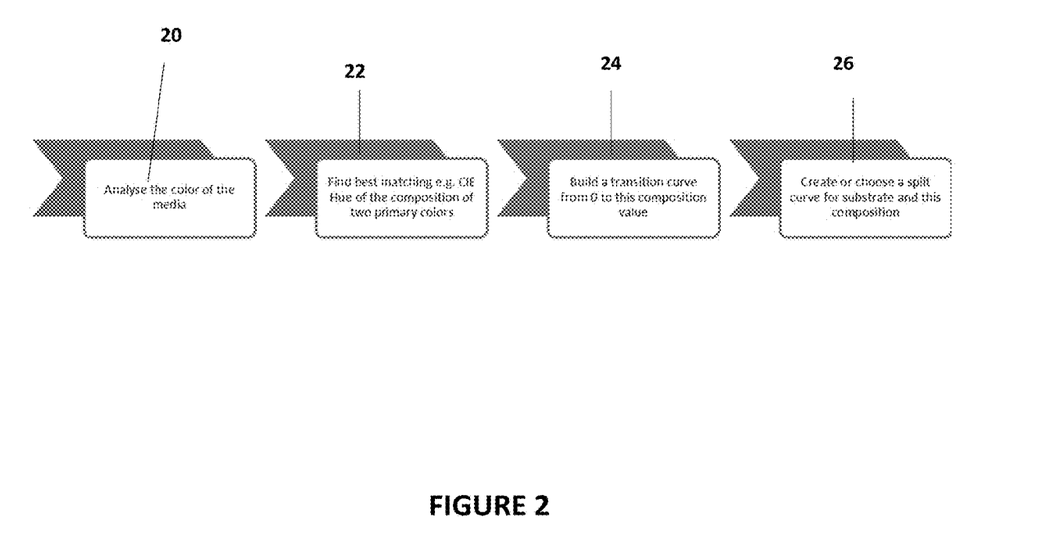
FIG. 2 is a flow diagram in which the substrate is used as a colorant component of more than one printer color channel according to the invention.

FIG. 2 is a flow diagram in which the substrate is used as a colorant component of more than one printer color channel according to the invention. In FIG. 2, the color of the media is analyzed 20. A best matching color is found 22, e.g. find the CIE Hue of the composition of two primary colors. A transition curve is built from 0 to the composition value 24, and a spilt curve is created or chosen for the substrate and the composition 26.

In another embodiment of the invention, where there is colored substrate, e.g. a red substrate, a certain percentage (custom definable) of yellow is added to it to produce a desired orange color. Instead of mixing the substrate color with process colors and adding the substrate color to the printer gamut this embodiment of the invention adds a custom definable colorant, perhaps very often used in certain print products, to the printer colors. In this embodiment, for example, the red substrate+yellow ink/toner is used directly instead of otherwise mixing magenta+yellow. With the same technique, shades of orange are produced out of red substrate+white ink/toner+a reduced percentage of yellow in accordance to the printed percentage value. Those skilled in the art will appreciate that any desired color or variant thereof can be produced as a custom definable colorant by using the substrate color and a specific ink/toner color directly.

In the example above, the composition of the red substrate and a composed printer color should deliver a linear behavior of this color. Only then can this color be used within a CMM process. Therefore searching for an M+Y composition which is close to the substrate colorant is important. Only then can the super-composition of substrate, M+Y from 0 to 100% deliver a predictable color behavior. This is the new print channel. Thus, it is necessary to find the 100% value of the printing ink/toner to build a linear function from 0 to 100% to ramp up both colors (see FIG. 2:24) For example, assume the substrate color is best represented from a 50% Magenta+80% Yellow overprint. This combination is the 100% tone; 50% of this tone would be half of these values, leading to 25% Magenta and 40% Yellow. All other values between 0 and 100 are calculated accordingly. It has to be understood that the exact behavior needs to be determined and is dependent on the specific printer-substrate-ink/toner combination.

Figure 3A:
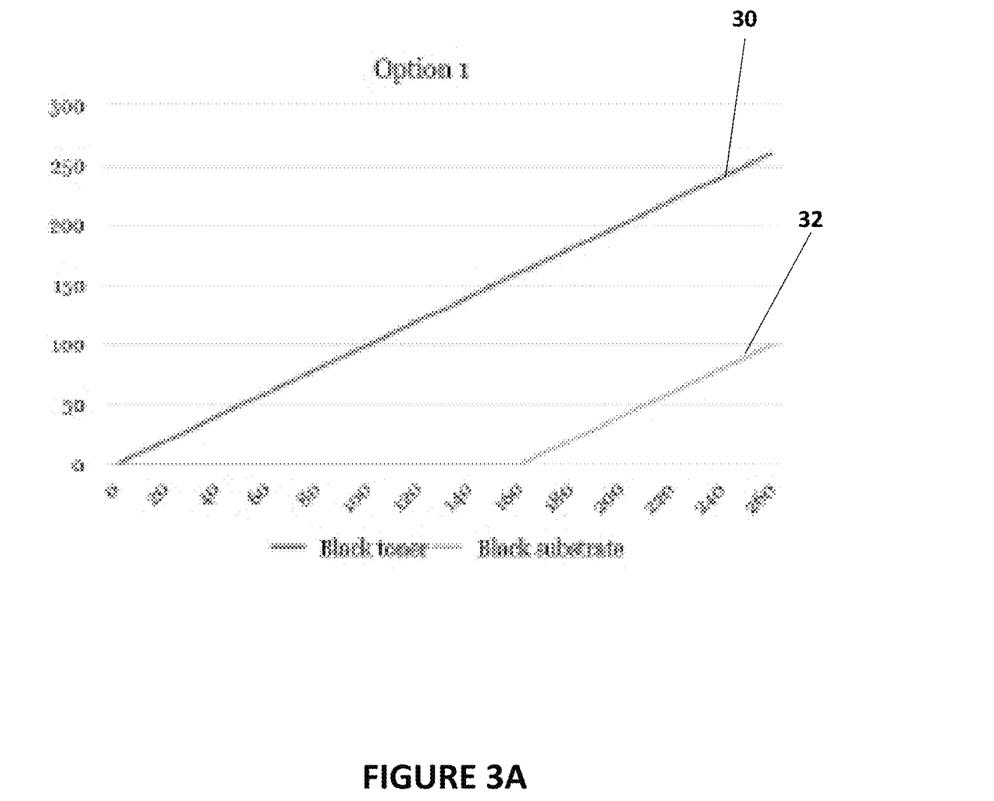
FIGS. 3A and 3B are a first graph (FIG. 3A) and a second graph (FIG. 3B) showing two options for distribution functions for combining e.g. black substrate with black toner/ink according to an embodiment of the invention.
Figure 3B:
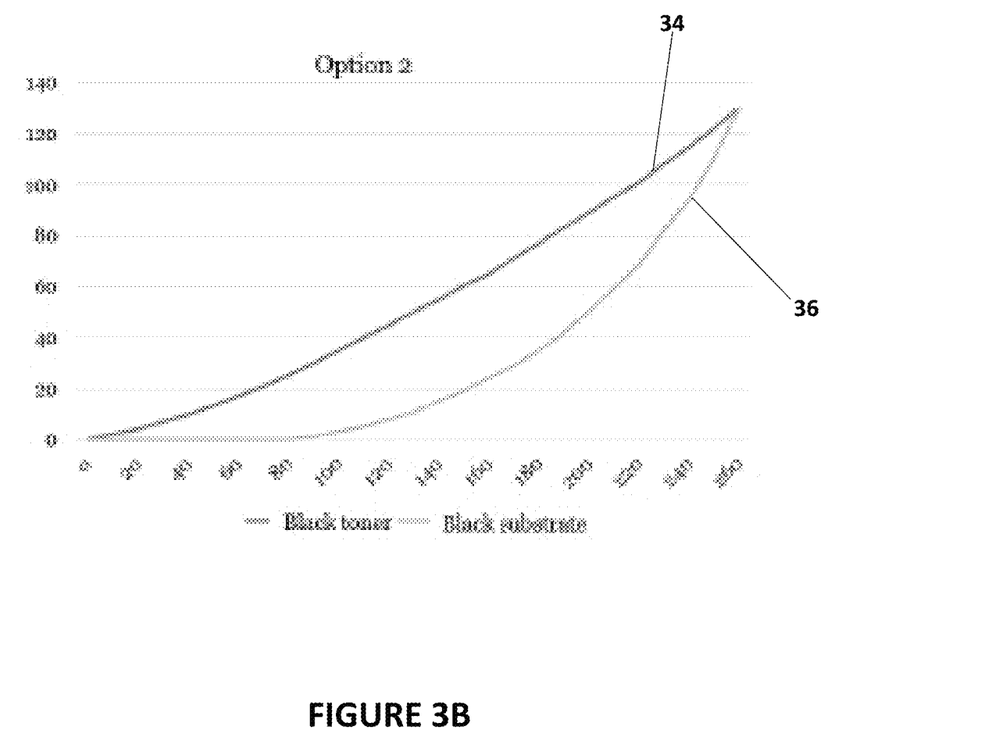

FIGS. 3A and 3B are a first graph (FIG. 3A) and a second graph (FIG. 3B) showing two options for distribution functions for combining e.g. black substrate with black toner/ink according to an embodiment of the invention.

In FIG. 3A, referred to as Option 1, a selected value of black, as shown along the x axis of the graph in FIG. 3A, is produced by a combination of black toner 30 and the black substrate 32, as shown along the y axis of the graph in FIG.

3A. This is one option of composing the resulting black layer from the black substrate and the black ink/toner. In this case the black ink/toner is used from 0 to 63% exclusively and then the black substrate is added. In this embodiment, the values are for 8 bits between 0 and 255. It is possible to have the opposite distribution function or even any other split function in use here.

FIG. 3B is a second graph showing the use of a black substrate as an additional black colorant according to an embodiment of the invention. In FIG. 3B, referred to as Option 2, a selected value of black, as shown along the x axis of the graph in FIG. 3B, is produced by a combination of black toner 34 and the black substrate 36, as shown along the y axis of the graph in FIG. 3B. The embodiment of FIG. 2B represents another option to compose the black for a print. Both curves start at 0%. The black toner is ramped up to 50% and the black substrate follows with a slope to this value as well. The sum of both gives 100%. This example represents the bandwidth of this distribution function.

Those skilled in the art will appreciate that the graphs of FIGS. 3A and 3B are provided as examples of combinations of ink and substrate values that are used to produce a desired colorant value. The invention is not limited to black inks/substrates, and any substrate color may be combined with an ink to reduce the amount of that ink required to produce a desired colorant and/or to extend the gamut of the ink.

To add the substrate color as a component to the printer colorant, the white ink/toner is used. The component that the substrate adds to the resulting color value is created with that specific amount of white which allows the needed amount of substrate colorant to shine through. Instead of, as of today, blocking the whole substrate color with white and add on top additional ink/toner from the printer to print the artwork, the substrate colorant is added to the color composition by varying the coverage with white. There are many ways possible to do this. One simple way is to create the white channel out of the inverse value of e.g. the black. For example, to print 20% black, 80% white is printed instead. For 40% black, print 60% white, and so on.

This embodiment of the invention allows creation of any colorant value, usually in the scale between 0-100%, with the substrate colorant. Adding on top of the substrate colorant the corresponding ink/toner of the printing press extends the intensity (chroma or darkness) of the resulting composed color. Before printing color accurately with such a system, a calibration process has to be applied. Such process can be undertaken using, for example, the Fiery Color Profiler Suite, sew https://www.efi.com/products/fiery-servers-and-software/fiery-workflow-suite/fiery-color-profiler-suite/overview/.

Figure 4:
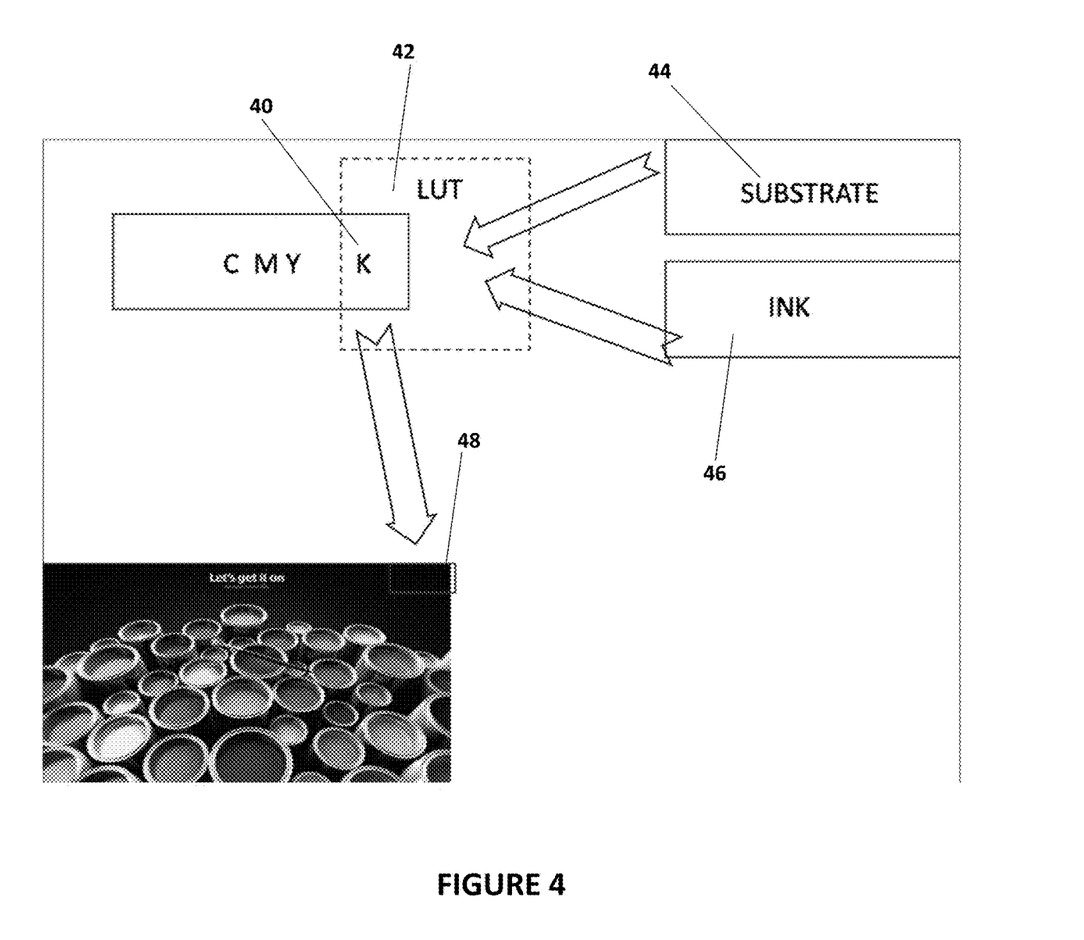
FIG. 4 is a flow diagram showing that for the black (K) any colored image includes portions where the substrate color is used in addition to the printing color according to the invention.

FIG. 4 is a flow diagram showing that for the black (K) any colored image includes portions where the substrate color is used in addition to the printing color according to the invention. In FIG. 4, a LUT 42 includes values for CMYK colors. In FIG. 4, the value for black (K) 40 is composed of the substrate color 44 and the ink color 46. When the LUT is accessed to print black the resulting color black 48 on the substrate is composed of both the substrate color and that of the ink applied to the substrate.

Figure 5:
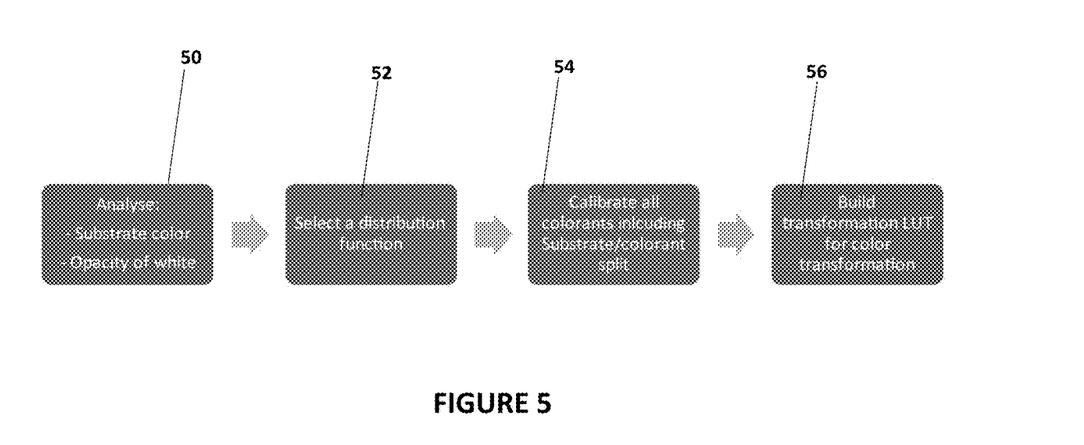
FIG. 5 is a flow diagram showing a calibration process where the substrate color is a process color according to an embodiment of the invention.

FIG. 5 is a flow diagram showing a calibration process where the substrate color is a process color according to an embodiment of the invention. In FIG. 5, the substrate colorant and the opacity of the white ink/toner 50 are analyzed. A set of patches is created. Assume there is a black substrate. Then create black patches based on the picked distribution function out of a combination of the substrate+white and the black ink/toner. A ramp is created, for example in 10% steps from 0 to 100 following the distribution function from 1 or 2 or any other. These patches are then measured. A calibration curve is created to accomplish the linearization aim, e.g. linear CIE L*.

The result of this analysis defines which printer channel the substrate color extends, e.g. C, M, Y, or K. The distribution function 52 is selected or created dynamically. There are many options possible to build such a function. It can be defined by the specifics of the press or the process or it can be selected by the user. It is related to the specifics of the press, how opaque the white ink/toner is, how strong and neutral the black substrate is, etc.

With these definitions a state of the art calibration process 54 must be applied. As a result of this, a predictable color behavior of each color channel is achieved. With this, a conversion LUT 56, as also used in state of the art ICC profiles, can be created. With these preparations, the printer-substrate-ink/toner system is ready for the color reproduction of any artwork.

Figure 6:
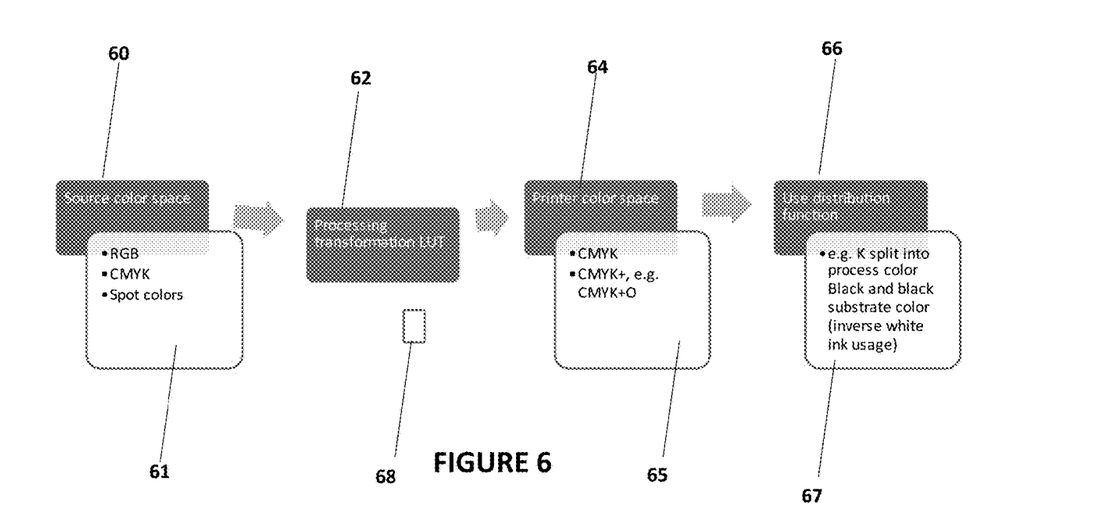
FIG. 6 is a flow diagram showing image color processing, applicable for any pixel of the image, where the substrate color is a process color according to an embodiment of the invention.

FIG. 6 is a flow diagram showing image color processing, applicable for any pixel of the image, where the substrate color is a process color according to an embodiment of the invention. In FIG. 6, the image is provided in a source color space 60, which may be any known color space 61 such as RGB, CMYK, CIE L*a*b* spot colors, etc. The image is transformed 62, for embodiments via a look up table (LUT) 68 to a printer color space 64, which may be any known color space 65 such as CMYK, CMYK+, e.g. CMYK+O, etc. Thereafter, a distribution function 66 is used in which the substrate is added as a colorant 67, e.g. the colorant black (K) is split into process color black and substrate color black.

The reduction of the white ink/toner, because of this technology, allows the digital front end (DFE), such as a Fiery Digital Front End (https://www.efi.com/products/fiery-servers-and-software/fiery-digital-print-servers/) to use more of the other colorants without exceeding the printer-substrate specific maximum ink/toner allowance and without reducing the colorants significantly for compliance with the printer-substrate specific maximum ink/toner allowance. Either case leads to a significant extension of the printable gamut.

Embodiments of the invention are also applicable to printing processes where the substrate colorant is an add-on and not within the set of ink/toner colorants, e.g. a printing press with CMY (+White) and a black substrate. In this case the CMYK printout can be composed from the printer colorants and the substrate colorant too. The black channel is built from the substrate colorant and a certain portion of white ink/toner, delivering the specific black percentage for the printing process. Also this application is not limited to a specific colorant, neither to CMYK, the standard printing colors, only. Even for printers with e.g. CMYK (+White) printing on red substrate, the technology can be used.

Figure 7:
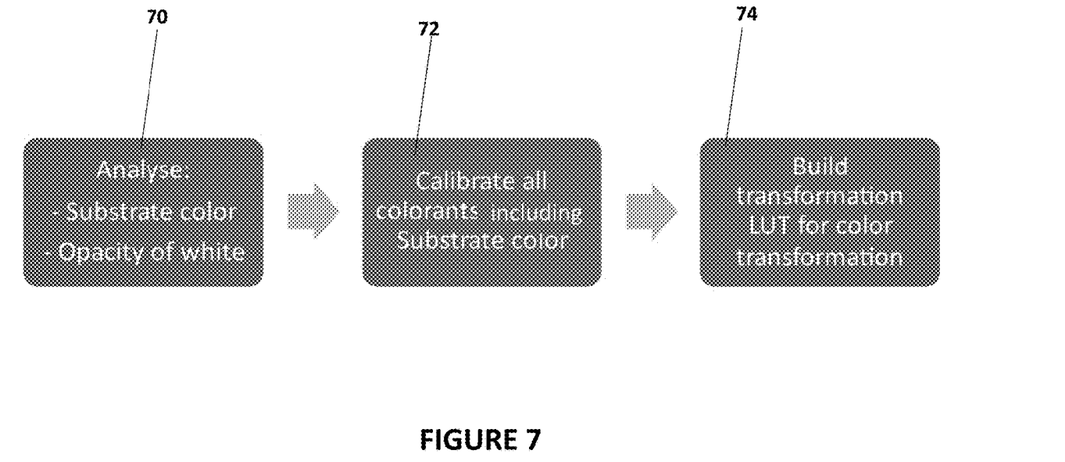
FIG. 7 is a flow diagram showing a calibration process where the substrate color replaces a process color according to an embodiment of the invention.

FIG. 7 is a flow diagram showing a calibration process where the substrate color replaces a process color according to an embodiment of the invention. In FIG. 7, substrate color and opacity of white are analyzed 70. For example consider a printer which has CMK but no yellow. Printing is to occur on a yellow substrate. The inverse white usage blocks the yellow of the substrate as needed to create the specific percentage of yellow for every pixel. So opposite to the description above, here there is not a composition of substrate+ink/toner. Instead the substrate itself is a colorant.

All colorants including the substrate color are calibrated 72. A transformation LUT is then built for color transformation 74.

Figure 8:
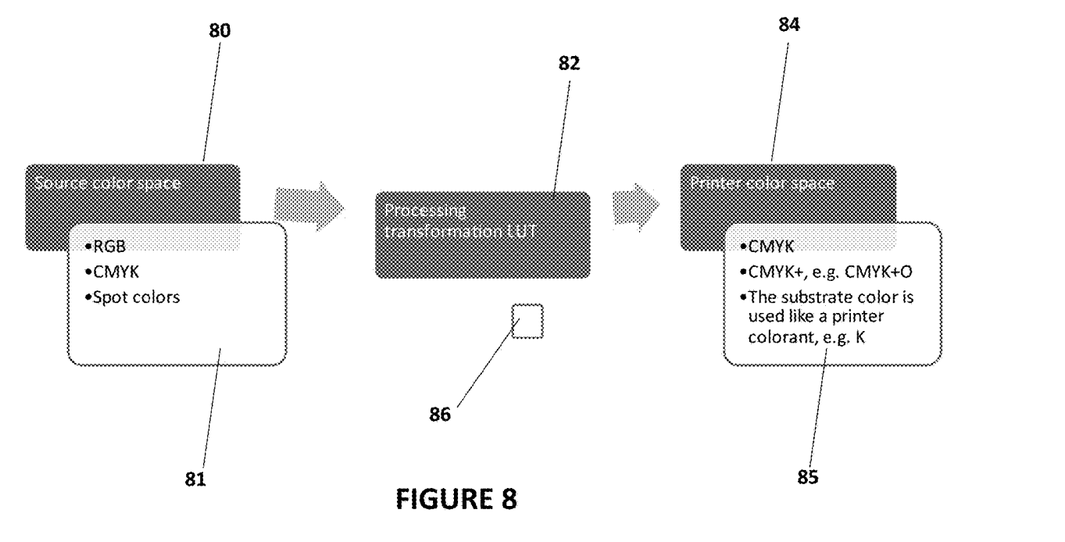
FIG. 8 is a flow diagram showing image color processing, applicable for any pixel of the image, where the substrate color replaces a process color according to an embodiment of the invention.

FIG. 8 is a flow diagram showing image color processing, applicable for any pixel of the image, where the substrate color replaces a process color according to an embodiment of the invention. In FIG. 8, the image is provided in a source color space 80, which may be any known color space 81 such as RGB, CMYK, CIE L*a*b* spot colors, etc. The image is transformed 82, for embodiments via a LUT 86 to a printer color space 84, which may be any known color space 85 such as CMYK, CMYK+, e.g. CMYK+O, etc., where the substrate color is used as a printer colorant, e.g. K.

The benefits and advantages of the implementations described herein also include a reduction excessive greenhouse gas emissions due to the decreased need for energy and the mitigated environmental effect of volatile ink components and the reduced burden on the environment as landfill due to the reduced need to dispose of ink cartridges. Thus, as a result of replacing ink colorant with substrate as a colorant ink usage is reduced and excessive greenhouse gas emissions are reduced due to the decreased need for energy and the mitigated environmental effect of reduced release of volatile ink components into the atmosphere.

Computer Implementation

Figure 9:
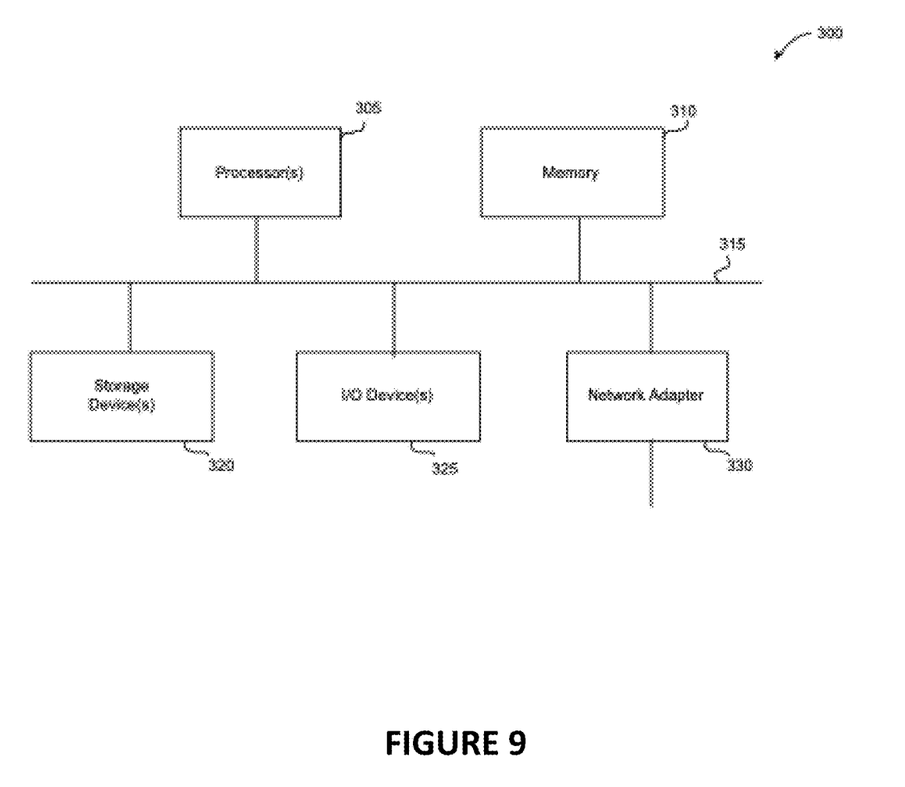
FIG. 9 is a block diagram of a computer system as may be used to implement certain features of some of the embodiments of the invention.

FIG. 9 is a block diagram of a computer system as may be used to implement certain features of some of the embodiments. The computer system may be a server computer, a client computer, a personal computer (PC), a user device, a tablet PC, a laptop computer, a personal digital assistant (PDA), a cellular telephone, an iPhone, an iPad, a Blackberry, a processor, a telephone, a web appliance, a network router, switch or bridge, a console, a hand-held console, a (hand-held) gaming device, a music player, any portable, mobile, hand-held device, wearable device, or any machine capable of executing a set of instructions (sequential or otherwise) that specify actions to be taken by that machine.

The computing system 300 may include one or more central processing units ("processors") 305, memory 310, input/output devices 325, e.g. keyboard and pointing devices, touch devices, display devices, storage devices 320, e.g. disk drives, and network adapters 330, e.g. network interfaces, that are connected to an interconnect 315. The interconnect 315 is illustrated as an abstraction that represents any one or more separate physical buses, point to point connections, or both connected by appropriate bridges, adapters, or controllers. The interconnect 315, therefore, may include, for example, a system bus, a Peripheral Component Interconnect (PCI) bus or PCI-Express bus, a HyperTransport or industry standard architecture (ISA) bus, a small computer system interface (SCSI) bus, a universal serial bus (USB), IIC (I2C) bus, or an Institute of Electrical and Electronics Engineers (IEEE) standard 1394 bus, also called Firewire.

The memory 310 and storage devices 320 are computer-readable storage media that may store instructions that implement at least portions of the various embodiments. In addition, the data structures and message structures may be stored or transmitted via a data transmission medium, e.g. a signal on a communications link. Various communications links may be used, e.g. the Internet, a local area network, a wide area network, or a point-to-point dial-up connection. Thus, computer readable media can include computer-readable storage media, e.g. non-transitory media, and computer-readable transmission media.

The instructions stored in memory 310 can be implemented as software and/or firmware to program the processor 305 to carry out actions described above. In some embodiments, such software or firmware may be initially provided to the processing system 300 by downloading it from a remote system through the computing system 300, e.g. via network adapter 330.

The various embodiments introduced herein can be implemented by, for example, programmable circuitry, e.g. one or more microprocessors, programmed with software and/or firmware, or entirely in special purpose hardwired (non-programmable) circuitry, or in a combination of such forms. Special-purpose hardwired circuitry may be in the form of, for example, one or more ASICs, PLDs, FPGAs, etc.

The language used in the specification has been principally selected for readability and instructional purposes. It may not have been selected to delineate or circumscribe the subject matter. It is therefore intended that the scope of the technology be limited not by this Detailed Description, but rather by any claims that issue on an application based hereon. Accordingly, the disclosure of various embodiments is intended to be illustrative, but not limiting, of the scope of the technology as set forth in the following claims.

The invention claimed is:

1. A color management method, comprising:
    determining color of a substrate for use as a printing medium;
    applying a composing function to add said substrate color as a colorant extension to an ink/toner in a printer color channel; and
    during printing, said composing function applying varying coverage of white ink/toner to create a white channel from an inverse value of the substrate colorant, wherein the substrate color adds to a resulting color value created with a predetermined amount of white ink/toner to allow a desired amount of substrate colorant to be visible through said white ink/toner;
    creating a look up table (LUT) that includes values for CMYK colors; and
    accessing said LUT to print a color value on the substrate, wherein the color value includes said composing function comprising the substrate color and the white ink/toner applied to the substrate;
    wherein said composition of said ink/toner and said substrate comprise a colorant that adds to a printing gamut at a specific print location where said colorant is used purely or mixed with other colorants.

2. The method of claim 1, further comprising:
    said composing function using said substrate as a colorant first and then adding said ink/toner to said colorant as a secondary colorant.

3. The method of claim 1, further comprising:
    said composing function using said ink/toner colorant first and then adding said substrate to said colorant as a secondary colorant.

4. The method of claim 1, wherein said substrate colorant is a dominant colorant component.

5. The method of claim 1, wherein said substrate colorant is a trailing colorant component.

6. A colorant composition method, comprising:
    adding a substrate color as a colorant extension to an ink in a printer color channel, thereby combining an ink and a substrate color value to produce a desired colorant value for a printer color channel; and
    during printing, a composing function applying varying coverage of white ink/toner to create a white channel from an inverse value of the substrate colorant, wherein the substrate color adds to a resulting color value created with a predetermined amount of white ink/toner to allow a desired amount of substrate colorant to be visible through said white ink/toner;
creating a look up table (LUT) that includes values for CMYK colors; and
accessing said LUT to print a color value on the substrate, wherein the color value includes said composing function comprising the substrate color and the white ink/toner applied to the substrate;
wherein said substrate color is combined with said ink to reduce an amount of ink required to produce a desired colorant and/or to extend a gamut of the ink.

7. The method of claim 6, wherein said substrate color is added as a component to the printer colorant.

8. The method of claim 7,
wherein the substrate colorant is added to the color composition by varying coverage with white ink/toner.

9. The method of claim 6, further comprising:
performing a calibration process in which the substrate color is a process color.

10. The method of claim 9, further comprising:
analyzing the substrate color and the opacity of a white ink/toner to define a printer channel which the substrate color extends;
selecting or dynamically creating a distribution function;
applying a calibration process to said printer channel definition and said distribution function, wherein a predictable color behavior of each color channel is achieved; and
creating a conversion LUT.

11. The method of claim 1, further comprising:
using the substrate as a colorant component of more than one printer color channel.

12. The method of claim 1, further comprising:
adding a custom definable colorant to the printer colors by using the substrate color and a specific ink color directly.

13. The method of claim 12, further comprising:
producing desired shades of said custom definable colorant out of said substrate, white ink/toner, and a reduced percentage of said specific ink color in accordance with printed percentage value.

14. The method of claim 1, further comprising:
replacing ink colorant with substrate as a colorant;
wherein ink usage is reduced and excessive greenhouse gas emissions are reduced due to the decreased need for energy and the mitigated environmental effect of reduced release of volatile ink components into the atmosphere.

\* \* \* \* \*